(12) United States Patent
Behrens et al.

(10) Patent No.: US 10,339,803 B2
(45) Date of Patent: Jul. 2, 2019

(54) METHOD FOR OPERATING AN ASSISTANCE SYSTEM OF A MOTOR VEHICLE AND ASSISTANCE SYSTEM

(71) Applicant: Conti Temic microelectronic GmbH, Nürnberg (DE)

(72) Inventors: Alexander Behrens, Markdorf (DE); Steen Kristensen, Lindenberg im Allgäu (DE)

(73) Assignee: Conti Temic microelectronic GmbH, Nuremberg (DE)

( * ) Notice: Subject to any disclaimer, the term of this patent is extended or adjusted under 35 U.S.C. 154(b) by 163 days.

(21) Appl. No.: 15/414,975

(22) Filed: Jan. 25, 2017

(65) Prior Publication Data

US 2017/0132925 A1 May 11, 2017

Related U.S. Application Data

(63) Continuation of application No. PCT/DE2015/200385, filed on Jun. 22, 2015.

(30) Foreign Application Priority Data

Jul. 25, 2014 (DE) .......................... 10 2014 214 713

(51) Int. Cl.
*G08G 1/0962* (2006.01)
*G06K 9/00* (2006.01)

(52) U.S. Cl.
CPC ..... *G08G 1/09623* (2013.01); *G06K 9/00818* (2013.01)

(58) Field of Classification Search
None
See application file for complete search history.

(56) References Cited

U.S. PATENT DOCUMENTS

| 6,266,442 | B1 | 7/2001 | Laumeyer et al. |
| 8,170,340 | B2 | 5/2012 | Klefnez |
| 9,563,807 | B2 | 2/2017 | Faber et al. |
| 2001/0036293 | A1* | 11/2001 | Laumeyer .......... G06K 9/00818 382/104 |
| 2014/0172290 | A1* | 6/2014 | Prokhorov ......... G01C 21/3602 701/408 |

(Continued)

FOREIGN PATENT DOCUMENTS

| DE | 29902457 A | 7/2000 |
| DE | 102006059663 A1 | 6/2008 |

(Continued)

OTHER PUBLICATIONS

International Search Report and Written Opinion dated Oct. 12, 2015 from corresponding International Patent Application No. PCT/EP2015/200385.

(Continued)

*Primary Examiner* — Zaihan Jiang
*Assistant Examiner* — Samuel D Fereja

(57) ABSTRACT

The invention relates to a method for operating an assistance system of a motor vehicle. An image is detected by means of a camera of the assistance system and a traffic sign is determined within the detected image. An alignment of the determined traffic sign is determined with respect to the motor vehicle, and a signal device of the assistance system is triggered by the alignment.

18 Claims, 2 Drawing Sheets

(56) References Cited

U.S. PATENT DOCUMENTS

2015/0220795 A1    8/2015  Fischer et al.
2015/0345974 A1*  12/2015  Takahashi ............. B60W 50/14
                                                              701/461

FOREIGN PATENT DOCUMENTS

| DE | 102011006564 A1 | 10/2012 |
| DE | 102012110595 A1 | 5/2014 |
| DE | 102013204843 A1 | 10/2014 |
| JP | 2009014645 A | 1/2001 |
| JP | 2004272694 A | 9/2004 |
| JP | 2005025497 A | 1/2005 |
| JP | 2005284377 A | 10/2005 |
| JP | 2009020089 A | 1/2009 |

OTHER PUBLICATIONS

German Office Action dated Jan. 30, 2015 for corresponding German Patent Application No. 10 2014 214 713.1.

* cited by examiner

METHOD FOR OPERATING AN ASSISTANCE SYSTEM OF A MOTOR VEHICLE AND ASSISTANCE SYSTEM

CROSS-REFERENCE TO RELATED APPLICATIONS

This application claims the benefit of PCT Application PCT/EP2015/200385, filed Jun. 22, 2015, which claims priority to German Application DE 10 2014 214 7136.1, filed Jul. 25, 2014. The disclosures of the above applications are incorporated herein by reference.

TECHNICAL FIELD

The invention relates to a method for operating an assistance system of a motor vehicle and an assistance system of a motor vehicle.

BACKGROUND

Traffic signs are used to point out hazards or existing legal regulations to drivers of motor vehicles. For example, existing speed limits or conditions of roads are indicated with the aid of traffic signs. Traffic guidance is also represented by means of traffic signs such as, for example, the existence of a one-way street or of a dead-end road as well as a prohibition on entering a particular road. In recent times, motor vehicles have been equipped with an increasing number of assistance systems, in order to make it easier for drivers of motor vehicles to operate the same. Thus, assistance systems which are used to detect traffic signs are known. For this purpose, an area in front of the motor vehicle is recorded by means of a camera and a traffic sign imaged herein is determined.

In the case of certain traffic guidance locations such as, for example, intersections or forks, it is possible for a traffic sign to be detected, which does not apply to the direction the driver of the motor vehicle is turning. In order to exclude such erroneous detections, the detected traffic sign is usually compared with a stored overview map. In addition, the movement of the vehicle is detected and it is determined from this whether the traffic sign applies to the direction selected by the vehicle driver. The disadvantage of this is that there must exist an overview map showing the traffic routes, in order to be able to make such a comparison. In the event that the traffic guidance is altered, for example due to construction sites or the like, flawless operation of the assistance system is no longer guaranteed. Relatively up-to-date mapping material must also always be available to allow the assistance system to operate.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY OF THE INVENTION

An object of the invention is to indicate a particularly suitable method for operating an assistance system of a motor vehicle in which traffic signs which are relevant to the driver of the motor vehicle are, in particular, detected, wherein mapping material of the surroundings is expediently not required.

An image is detected by means of a camera in a first work step. The camera in this case is, for example, a mono or stereo camera, and therefore has one or two lenses. In particular, the camera points in the direction of travel of the motor vehicle. The image is preferably digitized on detection, so that the image is available in a digital form. In particular, the image shows or represents an area in front of the motor vehicle. A traffic sign is determined within the detected image. This is effected, for example, by means of pattern recognition or the like. In other words, the detected image is analyzed to establish whether a traffic sign is imaged. In this case, the term 'traffic sign' denotes, in particular, a road sign. In this case, the traffic sign which is determined comprises, in particular, a particular pattern and/or characters such as letters or numbers. During an additional work step, the alignment of the traffic sign determined in this way is determined with respect to the motor vehicle. In particular, the position and alignment of the camera with respect to other components of the motor vehicle are used for this purpose.

To sum up, the presence of the traffic sign and the alignment thereof with respect to the motor vehicle are determined on the basis of the detected image. In particular, the term 'alignment' is deemed to denote the angle which is formed between a straight line parallel to the longitudinal direction of the motor vehicle and a plane parallel to the traffic sign.

A signal device of the assistance system is triggered as a function of the alignment of the traffic sign which is determined in this way. The signal device comprises, for example, a display device such as a multifunctional display or a head-up display. In particular, a symbol representing the traffic sign is illustrated by means of the signal device. As an alternative to this or in combination therewith, the signal device includes an acoustic playback device. As an alternative to this or in combination therewith, the signal device is an interface with an additional assistance system, for example with a distance assistant. In other words, the additional assistance system is triggered by means of the signal device as a function of the alignment. For example, the signal device is triggered if the traffic sign represents a prohibition. Fittingly, the signal device is triggered if the alignment of the traffic sign with respect to the motor vehicle is within a determined angular range. Expediently, the signal device is not triggered if the angle between the longitudinal direction of the motor vehicle and the traffic sign itself is less than 45°.

The fact that the alignment of the traffic sign is taken into account means that the signal device is not triggered for all of the detected and determined traffic signs, resulting in a reduced flow of information and, therefore, a lower burden on the vehicle driver. In addition, the method does not require any information regarding a route, reducing its complexity and error-proneness. In addition, no specifications with respect to an interface with a navigation system or the like have to be met. Expediently, the method works without the assistance of road information and the assistance system is not coupled, in terms of signal technology, with a navigation system or the like.

The position of the traffic sign is determined with respect to the motor vehicle. In particular, this is effected by means of the detected image. In other words, both the position and the alignment of the traffic sign with respect to the motor vehicle are determined on the basis of the detected image. For example, a stereo camera is used for this purpose, and the image is a three-dimensional image of at least one area of the surroundings of the motor vehicle. Alternatively, the position is ascertained by means of knowledge about the size of the real traffic sign and on the basis of the size of the image of the traffic sign within the detected image. The signal device is preferably triggered as a function of the position and the alignment of the traffic sign. For example, the signal device is triggered if the alignment of the traffic sign to the longitudinal direction of the motor vehicle is 90°, and the position of the traffic sign from the motor vehicle deviates by less than a determined value. As an alternative to this or in combination therewith, the signal device is triggered, if the position of the traffic sign from a straight line extending in the longitudinal direction of the motor vehicle and through the latter deviates by less than a determined value such as, for example, 5 m. If, for example, it is not possible to fall below a determined distance of the motor vehicle from the traffic sign by an additional determined value, including in the event of a change in speed of the motor vehicle, in particular due to physical specifications, the signal device is not triggered.

The alignment of the traffic sign is determined on the basis of a perspective distortion within the detected image. In other words, the perspective distortion of the imaged traffic sign is ascertained and compared with a stored form of the traffic sign. Since traffic signs are usually regularly shaped, in particular in the form of a triangle, square or circle, a determination of the alignment is made possible without the assistance of other relatively complex algorithms. A gradient line which, in particular, represents an edge of the traffic sign and, for example, the edge of a signboard, is preferably determined within the detected image. This edge is preferably aligned horizontally so that, based on the gradient lines and the tilting thereof to the horizon which exists within the detected image, the alignment can be ascertained in a relatively time-saving manner. In particular, the gradient line is determined on the basis of a comparison of color values within the detected image. For this purpose, the image is subdivided into a number of areas and a particular value is assigned to each area, depending on the brightness or color. In this case, the gradient line extends between two of these areas which differ in the determined value above a predetermined threshold. In this way, a relatively time-saving and reliable allocation of the gradient line is made possible.

Alternatively, an eccentricity which comprises the image of the traffic sign within the detected image is used to determine the alignment. This is preferably effected in the case of circular traffic signs. In other words, the horizontal and vertical extents of the image of the traffic sign within the detected image are determined. In this case, the eccentricity is a measure of the deviation of the horizontal extent of the imaged traffic sign from the vertical extent thereof. In particular, the eccentricity is proportional to the root of the difference of the squares of the two extents.

An additional image is detected and the traffic sign herein is also determined, wherein the times the images are acquired expediently differ. In particular, the position of the motor vehicle with respect to the traffic sign differs when the two images are detected. The eccentricity of the image of the traffic sign is determined within the additional image. The two ascertained eccentricities are compared with one another, in order to ascertain the alignment of the traffic sign with respect to the motor vehicle. This process is expediently effected repeatedly. In other words, a number of additional images are detected and the traffic sign herein is determined in each case and the eccentricity is compared on the basis of the respective image, so that the course over time of the eccentricity of the image of the traffic sign is made available. If the eccentricity does not change or the eccentricity decreases, the signal device is triggered and a signal is emitted. If the eccentricity remains substantially the same, the alignment of the traffic sign with respect to the motor vehicle does not change. In particular, in the case of a comparatively small eccentricity, it is to be assumed that the traffic sign is of significance for the motor vehicle driver, and it is therefore necessary to signal this by means of the signal device. In the event that the eccentricity decreases, the alignment of the traffic sign with respect to the motor vehicle changes, wherein a vanishing eccentricity substantially corresponds to a traffic sign aligned vertically to the longitudinal direction of the motor vehicle. Such a traffic sign is, in all probability, relevant to the driver and is communicated to the vehicle driver by means of the signal device. If the eccentricity increases, no signal is preferably emitted.

As an alternative to this or in combination therewith, a straight line parallel to the alignment of the determined traffic sign is defined. As soon as the motor vehicle crosses this straight line, a signal is emitted by means of the signal device. In particular, the position of the traffic sign is also determined in this case and the straight line is defined by means of the position of the traffic sign. In other words, the straight line extends through the position of the traffic sign. Alternatively, the straight line with respect to the position is displaced by a determined value in the direction of the motor vehicle or away from the latter, wherein this value is preferably between 1 m and 10 m. In other words, the signal is emitted when the motor vehicle has reached an area behind the traffic sign or has at least approached this area up to a determined value. In this case, the signal is preferably only emitted, if the distance from the position of the traffic sign on crossing the straight lines is less than a predetermined value, wherein the value corresponds in particular to the width of a roadway. Fittingly, the distance is less than 10 m, 5 m or 2 m. In this way, even when the motor vehicle turns at an intersection, a traffic sign located on an opposite side of the roadway is not erroneously used to emit the signal.

The assistance system of a motor vehicle comprises a camera and a signal device and, for example, a computing device. The camera is, for example, a mono camera or a stereo camera and therefore comprises one or two lenses which are offset with respect to one another. In particular, the camera includes an image sensor for detecting images, for example a CCD or CMOS chip. The signal device is, for example, a head-up or multifunctional display or an interface for this. The assistance system is used for determining traffic signs. During operation, an image is detected first of all by means of the camera and a traffic sign is determined within the detected image. The alignment of the determined traffic sign is determined and a signal is emitted by means of the signal device as a function of the alignment. The assistance system is provided and set up to perform these work steps. For example, the assistance system is not coupled to a navigation system by means of signal technology. The assistance system preferably does not comprise any road information with respect to the surroundings of the motor vehicle, thus simplifying maintenance of the assistance system and the manufacture thereof.

Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
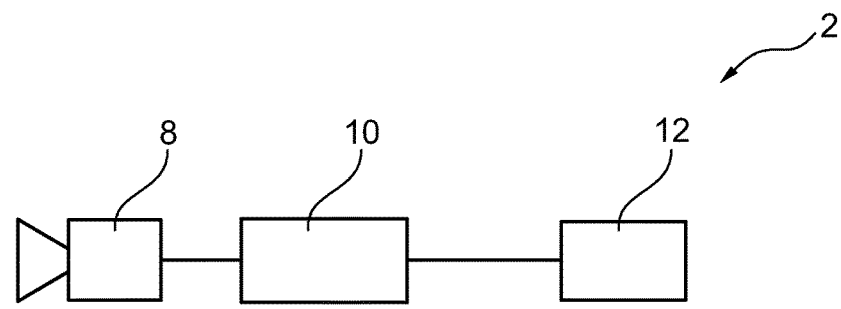
FIG. 1 shows an assistance system in a schematically simplified form.

Parts corresponding to one another are provided with the same reference numerals in all of the figures.

Figure 3:
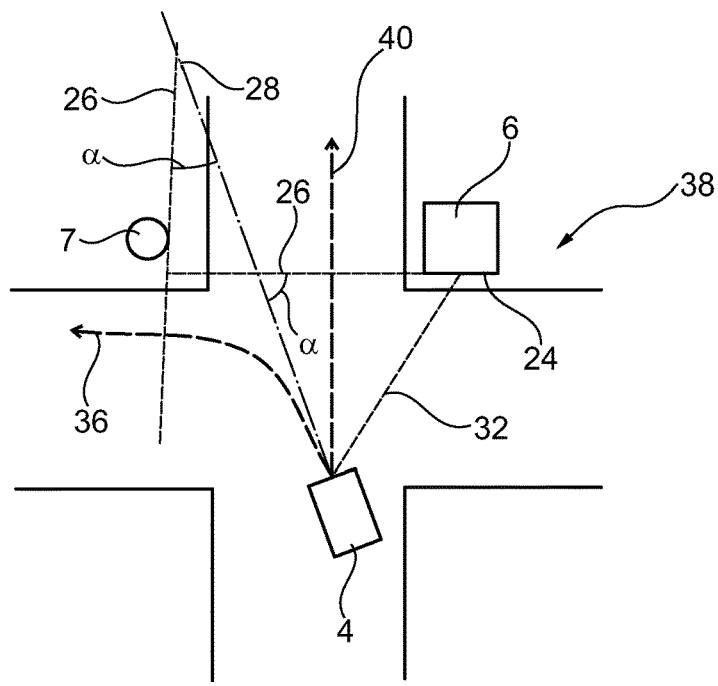
FIG. 3 shows a motor vehicle comprising the assistance system in a schematically simplified form.

An assistance system 2 of a motor vehicle 4 which is shown in FIG. 3 for detecting a traffic sign 6, 7 is shown in a schematically simplified form in FIG. 1. The assistance system 2 comprises a camera 8 having two lenses which are offset with respect to one another, with each lens having an image sensor assigned thereto. In addition, the assistance system 2 comprises a computing unit 10 as well as a signal device 12 which are coupled to one another by means of signal technology. In this case, the images created by means of the camera 8 are analyzed by means of the computing unit 10, wherein each of the images detected by means of the camera 8 contains the data from the two image sensors. The signal device 12 is a head-up display that projects information onto the windscreen of the motor vehicle.

Figure 2A:
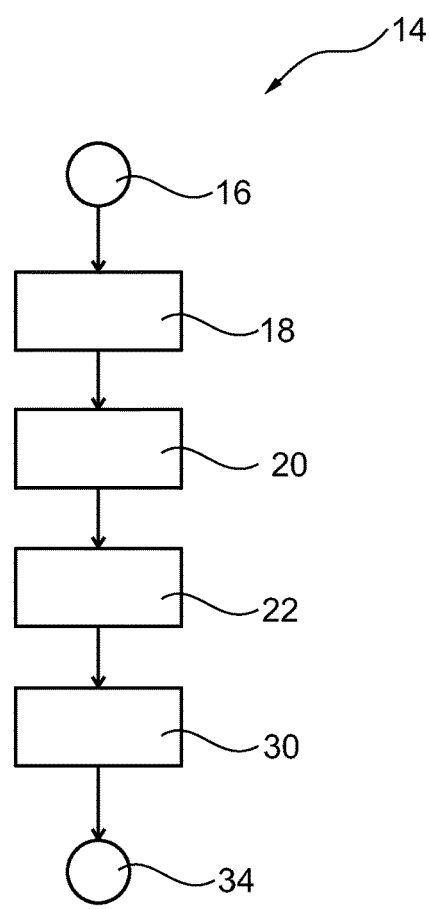
FIG. 2a shows a first method for operating the assistance system.

The assistance system 2 is operated in accordance with the method 14 shown in FIG. 2a. Following a starting event 16, an image of the surroundings of the motor vehicle 4 is detected in a first work step 18 by means of the camera 8. In this case, the starting event 16 is the presence of the traffic sign 6 in the detection range of the camera 8 or the motor vehicle 4 starting.

The image detected by means of the camera 8 is transmitted to the computing unit 10. In a second work step 20, the digitized image is evaluated and the image of the traffic sign 6 herein is identified. In a third work step 22, gradient lines which correspond to the edges of the board of the traffic sign 6 are assigned to the image of the traffic sign 6. In other words, the imaged edges of the board of the rectangular traffic sign 6 within the detected image are determined, which is effected by means of a gradient comparison of the individual pixels of the image. In this case, one of the gradient lines which corresponds to a horizontal edge of the board 24 is extended to a straight line 26 and intersects with another straight line 28 which is parallel to the longitudinal direction of the motor vehicle 4 and which extends through said motor vehicle. Based on the intersection of the two straight lines 26, 28, an alignment α of the traffic sign 6 is determined with respect to the motor vehicle 4, wherein the alignment α corresponds to the angle of intersection between the two straight lines 26, 28.

In a fourth work step 30, the position 32 of the traffic sign 6 is additionally ascertained with respect to the motor vehicle 4, wherein this is effected by means of triangulation based on the image recorded by means of the stereo camera.

In a fifth work step 34, a signal is emitted by means of the signal device 12 as a function of the trajectory followed by the motor vehicle 4. A first trajectory 36 corresponds to the motor vehicle 4 turning left at the intersection 38 shown in FIG. 3. In this case, the straight line 26, which is defined by means of the edges of the board 24 of the traffic sign 6, is not crossed by means of the motor vehicle 4, so that the traffic sign 6 does not apply to the driver of the motor vehicle 4. No signal is emitted by means of the signal device 12 when the first trajectory 36 is followed.

However, when the vehicle follows a second trajectory 40 which corresponds to the vehicle crossing straight over the intersection, the traffic sign 6 does apply to the driver. In this case, the straight line 26 is crossed by means of the motor vehicle 4, wherein the distance between the motor vehicle 4 and the traffic sign 6 is less than the width of a roadway. In this case, the signal device 12 is triggered by means of the computing unit 10 such that a reduced illustration of the traffic sign 6 is projected onto the windscreen of the motor vehicle 4, in order to inform the driver of the motor vehicle.

Figure 2B:
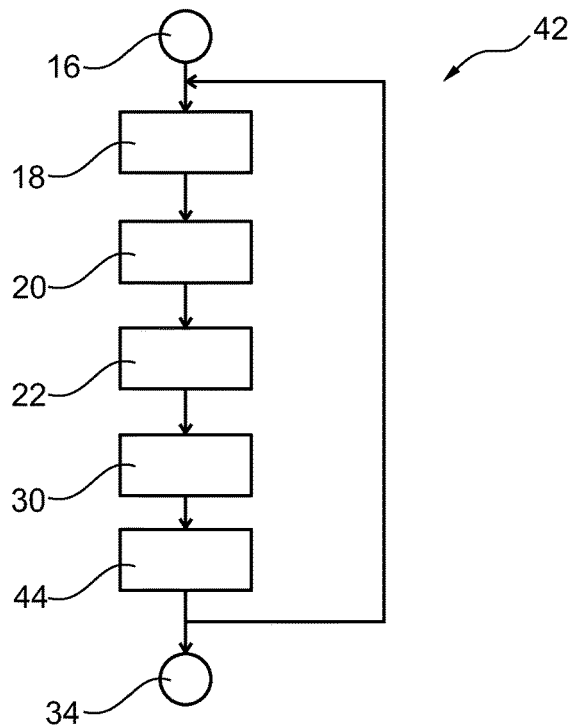
FIG. 2b shows an additional method.

FIG. 2b shows another method 42 for operating the assistance system 2, which is executed if the traffic sign 7 has a circular shape. In this case, the starting event 16, the detecting of the image in the first work step 18 and the determining of the traffic sign 7 within the image according to the second work step 20 correspond to the method 14 shown in FIG. 2a. The third work step 22 is modified in order to ascertain the alignment α of the traffic sign 6 with respect to the motor vehicle 4. In this case, the alignment of the traffic sign 7 is ascertained by determining the eccentricity of the image of the traffic sign 7. To this end, the horizontal extent of the image of the traffic sign 7 is compared with the vertical extent thereof. In the event of a vanishing eccentricity the two lengths are the same, which corresponds to an alignment α of 90°. In other words, the image of the traffic sign 7 is, in this case, a circle. The position 32 of the traffic sign 6 is, in turn, determined with respect to the motor vehicle 4 during the fourth work step 30.

Following the determining of the position 32, an image is again detected during the first work step 18 and the second, third and fourth work steps 20, 22, 30 are executed.

Following this, the eccentricity which is ascertained again is compared with the eccentricity which is already known in a sixth work step 44. The second, third, fourth and sixth work steps 20, 22, 30, 44 are then performed again. These processes are repeated, for example five times, so that the course over time of the eccentricity is known, wherein only those eccentricities where the position 32 of the traffic sign 7 with respect to the motor vehicle 4 is changed are taken into account. If the eccentricity remains the same, this corresponds to an alignment α of the traffic sign 7 with respect to the motor vehicle 4 of substantially 90°. In this case, the signal device 12 is operated and an image of the traffic sign 7 is projected onto the windscreen of the motor vehicle. The signal device 12 is also triggered in this way if the eccentricity decreases, since it should be assumed in this case that the traffic sign 7 does apply to the driver of the motor vehicle 4. This is, for example, the case with the second traffic sign 7 shown in FIG. 3, in which the alignment α on following the first trajectory 36 after turning into the side road substantially corresponds to 90°. As soon as the motor vehicle 4 passes the straight line 26 extending parallel to the traffic sign 7 and through the position 32 of the traffic sign 7 at a distance of less than 2 m from the traffic sign, on turning, the signal device 12 is triggered such that a reduced illustration of the traffic sign 7 is projected onto the windscreen of the motor vehicle 4.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the scope of the following claims.

What is claimed is:

1. A method for operating an assistance system of a motor vehicle comprising
   detecting an image with a camera of the assistance system;
   determining a traffic sign within the detected image;
   determining an alignment of the determined traffic sign with respect to the motor vehicle, wherein the alignment indicates an angle formed between a straight line parallel to a longitudinal direction of the motor vehicle and a plane parallel to the traffic sign, and
   triggering a signal device of the assistance system as a function of the alignment, wherein the signal device is triggered if the alignment of the traffic sign with respect to the motor vehicle is within a determined angular range;
   wherein alignment of the determined traffic sign is determined by dividing an image of a traffic sign within a detected image, into a number of areas and, assigning a particular value to each area depending on at least one of: a brightness and a color of an area,
   wherein a gradient line extends between two of said areas that differ from each other by a determined value and that are above a predetermined threshold, the gradient line representing an edge and thus an angle of the traffic sign relative to the straight line parallel to the longitudinal direction of the motor vehicle.

2. The method of claim 1, wherein the position of the traffic sign is determined with respect to the motor vehicle.

3. The method of claim 1, wherein the alignment of the determined traffic sign is determined on the basis of a perspective distortion.

4. The method of claim 3, wherein a gradient line within the detected image is used in order to determine the alignment of the determined traffic sign.

5. The method of claim 3, wherein an eccentricity is used in order to determine the alignment of the determined traffic sign.

6. The method of claim 5, wherein an additional image is detected and the traffic sign within the additional image is determined and the eccentricity is determined, and the two determined eccentricities are compared.

7. The method of claim 6, wherein a number of such additional images is detected and, in each case, the eccentricity is determined and these are compared.

8. The method of claim 6, wherein a signal is emitted by the signal device if there is one of a decrease in eccentricity and no change in the eccentricity.

9. The method of claim 1, wherein in which a signal is emitted by the signal device when a straight line parallel to the alignment of the determined traffic sign is crossed by the motor vehicle.

10. The method of claim 1, wherein in which a signal is emitted by the signal device when a straight line parallel to the alignment of the determined traffic sign is crossed by the motor vehicle.

11. An assistance system of a motor vehicle comprising:
    a camera for the vehicle, which detects an image; a signal device; and
    electronic control unit with instructions for:
    determining a traffic sign within the detected image;
    determining an alignment of the determined traffic sign with respect to the motor vehicle, wherein the alignment indicates an angle formed between a straight line parallel to a longitudinal direction of the motor vehicle and a plane parallel to the traffic sign, and
    triggering the signal device of the assistance system as a function of the alignment, wherein the signal device is triggered if the alignment of the traffic sign with respect to the motor vehicle is within a determined angular range;
    wherein alignment of the determined traffic sign is determined by the electronic control unit dividing an image of a traffic sign within a detected image, into a number of areas and, assigning a particular value to each area depending on at least one of: a brightness and a color of an area; and
    wherein the electronic control unit determines that a gradient line extends between two of said areas that differ from each other by a determined value and that are above a predetermined threshold, the gradient line representing an edge and thus an angle of the traffic sign relative to the straight line parallel to the longitudinal direction of the motor vehicle.

12. The system of claim 11, wherein the position of the traffic sign is determined with respect to the motor vehicle.

13. The system of claim 11, wherein the alignment of the determined traffic sign is determined on the basis of a perspective distortion.

14. The system of claim 13, wherein a gradient line within the detected image is used in order to determine the alignment of the determined traffic sign.

15. The system of claim 13, wherein an eccentricity is used in order to determine the alignment of the determined traffic sign.

16. The system of claim 15, wherein an additional image is detected and the traffic sign within the additional image is determined and the eccentricity is determined, and the two determined eccentricities are compared.

17. The system of claim 16, wherein a number of such additional images is detected and, in each case, the eccentricity is determined and these are compared.

18. The system of claim 16, wherein a signal is emitted by the signal device if there is one of a decrease in eccentricity and no change in the eccentricity.

* * * * *